United States Patent
Poppe et al.

[19]

[11] Patent Number: 6,104,744
[45] Date of Patent: Aug. 15, 2000

[54] REGULATION OR CONTROL OF A FUSION PROCESS IN A THREE-PHASE CURRENT ARC FURNACE

[75] Inventors: Thomas Poppe, München; Albrecht Sieber, Möhrendorf, both of Germany

[73] Assignee: Siemens Aktiengesellschaft, Munich, Germany

[21] Appl. No.: 09/381,252

[22] PCT Filed: Mar. 17, 1998

[86] PCT No.: PCT/DE98/00791

§ 371 Date: Sep. 17, 1999

§ 102(e) Date: Sep. 17, 1999

[87] PCT Pub. No.: WO98/42164

PCT Pub. Date: Sep. 24, 1998

[30] Foreign Application Priority Data

Mar. 19, 1997 [DE] Germany .......................... 197 11 453

[51] Int. Cl.[7] .................................................. H05B 7/144
[52] U.S. Cl. .......................................... 373/102; 373/104
[58] Field of Search ................................... 373/102, 104, 373/105; 323/210, 211

[56] References Cited

U.S. PATENT DOCUMENTS

| | | | |
|---|---|---|---|
| 3,757,021 | 9/1973 | Bockman | 373/102 |
| 4,580,272 | 4/1986 | Honkaniemi et al. | 373/104 |
| 4,663,764 | 5/1987 | Bretthauer et al. | 373/104 |
| 5,115,447 | 5/1992 | Bowman | 373/102 |
| 5,870,423 | 2/1999 | Gustavsson | 373/104 |

FOREIGN PATENT DOCUMENTS

| | | |
|---|---|---|
| 0 036 122 | 9/1981 | European Pat. Off. . |
| 22 04 882 | 8/1972 | Germany . |
| 26 15 202 | 10/1977 | Germany . |
| 27 31 014 | 1/1979 | Germany . |
| 44 15 722 | 11/1995 | Germany . |
| 44 15 727 | 11/1995 | Germany . |

OTHER PUBLICATIONS

R.W. Roberts et al., "Arc Resistance Regulation and Refractory Erosion Control", Electric Furnace Proceedings. 1976.

*Primary Examiner*—Tu Ba Hoang
*Attorney, Agent, or Firm*—Kenyon & Kenyon

[57] ABSTRACT

A method for regulation or control of the melting process in a three-phase arc furnace having at least three electrodes whose height is adjustable individually and independently of one another. Each phase of the three-phase current which feeds the three-phase arc furnace is assigned at least one electrode. The temperature of the three-phase arc furnace is monitored, particularly at points which are at risk of overheating, such as the walls of the three-phase arc furnace in the vicinity of the electrodes. When the three-phase arc furnace reaches a critical temperature in the vicinity of an electrode, the power emission from this electrode is reduced in such a manner that overheating of the three-phase arc furnace is prevented, and in that the power emission from the other electrodes or from some of the other electrodes is increased in such a manner that the total power emission from the electrodes is a maximum at a predetermined voltage.

13 Claims, 5 Drawing Sheets

REGULATION OR CONTROL OF A FUSION PROCESS IN A THREE-PHASE CURRENT ARC FURNACE

FIELD OF THE INVENTION

The present invention relates to a method and to a device for regulation and control of the melting process in a three-phase arc furnace having a least three electrodes whose heights are adjustable individually and independently of one another.

BACKGROUND INFORMATION

In three-phase arc furnaces, scrap metal is melted by means of electrical energy, with the conversion of the electrical energy into thermal energy that is required for the melting process taking place in the three arcs which burn between the electrode tips and the material to be melted. For process control, the operating point of the arc furnace can be varied by step-by-step adjustment at the voltage supplied to the arc furnace via a furnace transformer, as well as by step-by-step, separate adjustment, of the distances between the electrode tips and the material to be melted. The chosen operating point is maintained by controlling the distances between the electrodes and the material to be melted. This is generally done by means of impedance regulation b forming an actual impedance value for each electrode from continuously measured electrical variables such as the phase voltage and the phase current, and using the error between this actual impedance value and a predetermined set impedance value to define a manipulated variable for adjusting the height of the respective electrode.

In order to match the operating point of the arc furnace to the variable requirements for furnace operation during the melting process, those operating points which are respectively assigned to a voltage level on the furnace transformer from predetermined characteristics for furnace operation are stored, in the case of a method that is described in European Patent No. 0 036 122, as set impedance values in a digital memory. The furnace operator then manually selects suitable operating points from this digital memory during the melting process.

The presetting of the operating points and set impedance values for setting the height of the electrodes has until now been carried out as a function of previously defined process phases (first bucket, second bucket, refining) and sections within these process phases (placing the electrodes against the cold scrap, melting down, final melting on a flat melt bath), with the set impedance values in each case being predetermined and fixed during these sections. This previous procedure is based on the assumption that the conditions within a section remain sufficiently constant and are reproducible from charge to charge. Steady-state balancing of the three-phase arc furnace is also carried out on the basis of similar principles.

On the basis of relatively detailed knowledge about the behavior of alternating-current arcs in three-phase arc furnaces, one may, however, assume that the preconditions for steady-state setting of the arc furnace do not occur. In fact, it should be assumed that the conditions in the individual arcs vary even during the sections of the process phases and, in particular, unbalanced operating conditions can occur with respect to the arrangement of the electrodes in the three-phase arc furnace. If the set impedance values are then set in a balanced and steady-state manner on the assumption of balanced conditions in the arc furnace, then, if the furnace conditions are actually asymmetric, this leads to different manipulated variables which then produce arcs of different length via the adjustment of the heights of the electrodes. Optimum utilization of the power supply to the arc furnace is not possible in this case.

SUMMARY

AN object of the present invention is to increase the power emission from the electrodes.

This object is achieved according to the present invention by providing a method and a device in which when the three-phase arc furnace reaches a critical temperature in the vicinity of an electrode, the power emission from this electrode is reduced in such a manner that overheating of the three-phase arc furnace is prevented and the power emission from the other electrodes or from some of the electrodes is increased in such a manner that the total power emission from the electrodes is a maximum at a predetermined voltage. In this case, the impedances in the current paths of the electrodes are advantageously optimized in the sense of maximizing the total power emission from the electrodes, wherein, when the three-phase arc furnace reaches a critical temperature in the vicinity of an electrode, the power emission from this electrode is limited to a maximum value, and wherein this maximum value is taken into account in the sense of a secondary condition in the optimization, as described in, for example, in German Patent No. 44 15 727. If the supply voltage to the electrodes is not reduced in this case, provided a second critical temperature limit is not exceeded, an increase in the production upwards of about 7 to 12% is achieved.

This optimization process is carried out on-line in a particularly advantageous manner.

In an advantageous refinement of the present invention, if the temperature of the three-phase arc furnace in the vicinity of an electrode is above a first critical temperature limit and below a second critical temperature limit, a redistribution of the power emission from the individual electrodes is carried out, with the supply voltage to the electrodes being kept constant. If the temperature of the three-phase arc furnace in the vicinity of an electrode is above the second critical temperature limit, a redistribution of the power emission from the individual electrodes is advantageously carried out, with the supply voltage to the electrodes being reduced.

Figure 5:
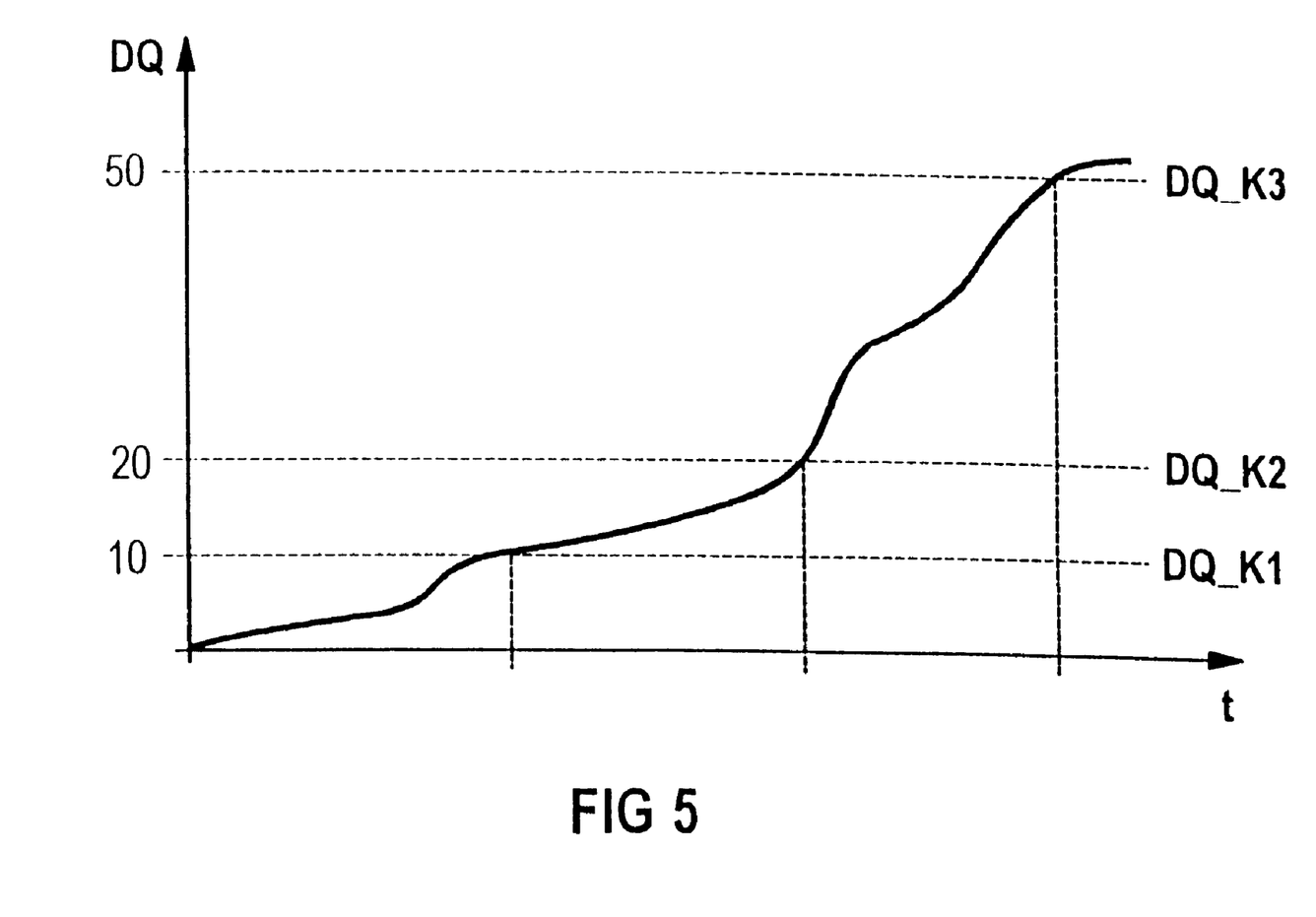
FIG. 5 shows an impedance regulation system according to the present invention.

In another advantageous refinement of the present invention, if the temperature of the three-phase arc furnace in the vicinity of an electrode is above a third critical temperature limit, which is above the second critical temperature limit, the supply voltage to the electrodes is greatly reduced. This version is shown in FIG. 5.

The method according to the invention operates particularly reliably if previously estimated temperature values are used instead of the measured or estimated values for the temperature of the three-phase arc furnace. This previous estimation is advantageously carried out using a gradient method or a temperature model, in which case the temperature model may be an analytical model or a neural network.

In another advantageous refinement of the present invention, the temperature of the three-phase arc furnace is regulated in such a manner that the real power emitted from an electrode is reduced when the temperature of the three-phase arc furnace exceeds a set temperature, and the real power emitted is increased when the temperature of the three-phase arc furnace is less than a set temperature. In this case, the set temperature advantageously corresponds to a critical temperature limit, which is in the region of a three-phase arc furnace temperature that is just still permissible.

DETAILED DESCRIPTION

Figure 1:
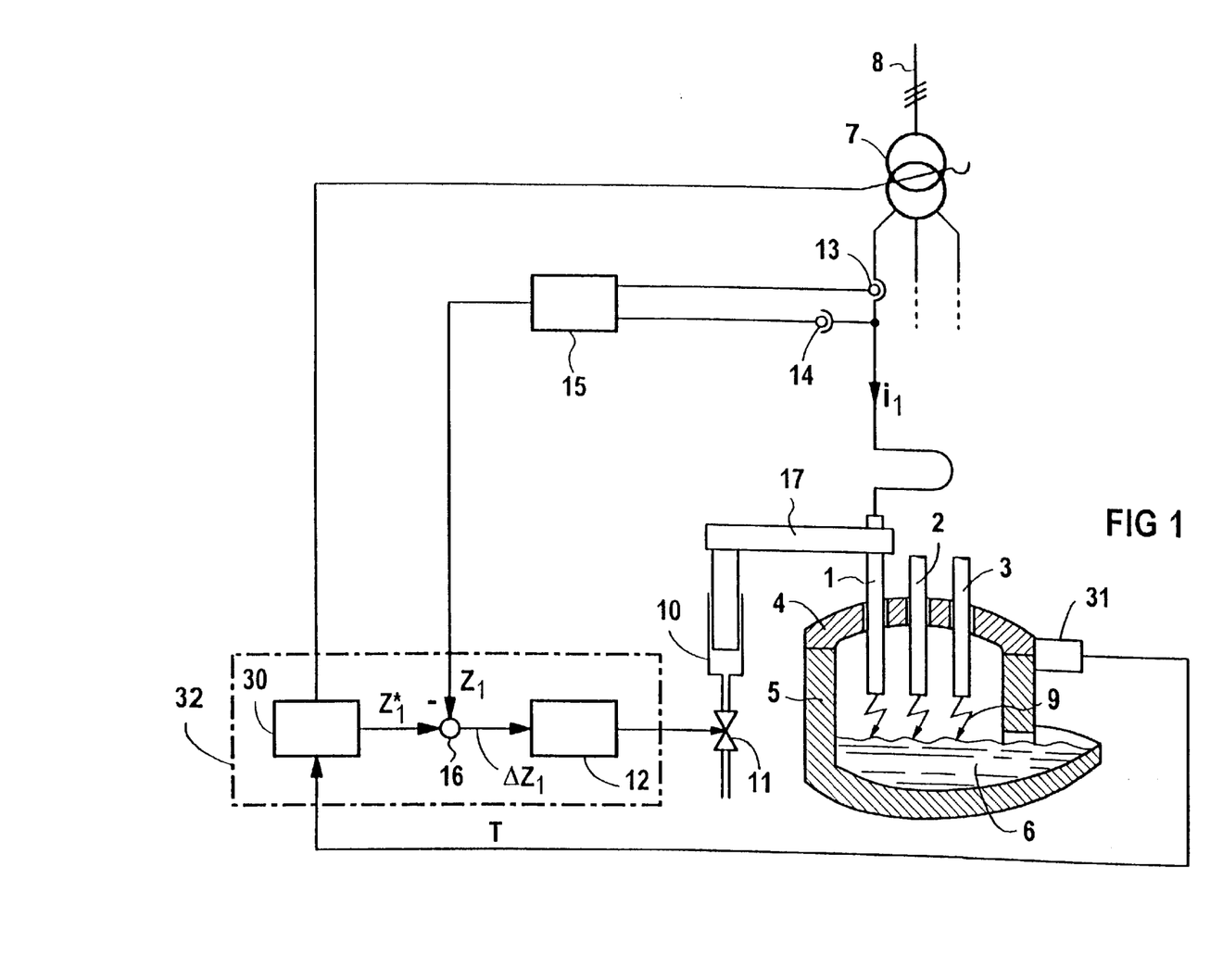
FIG. 1 shows a schematic illustration of a three-phase arc furnace having an upstream furnace transformer and a regulation arrangement according to the present invention.

FIG. 1 shows a three-phase arc furnace in which three graphite electrodes 1, 2 and 3 project through openings in a furnace cover 4 into a furnace vessel 5, into which scrap metal 6 is introduced as the material to be melted. The electrodes 1, 2 and 3 are connected to a three-phase power supply 8 via a furnace transformer 7 which can be adjusted step-by-step. Arcs 9 are formed between the tips of the electrodes 1, 2 and 3 and the material 6 to be melted, in which arcs 9 the electrical energy supplied to the arc furnace is converted into thermal energy, in order to melt the material 6 to be melted.

Each electrode 1, 2 and 3 is equipped with a regulation arrangement. Since the regulation arrangements are all designed in exactly the same way, only the regulation arrangement for the electrode 1 will be described in more detail. In the same way as the other respective electrodes 2 and 3, the electrode 1 is mounted on a supporting arm 17 whose height is adjustable via a hydraulic positioning apparatus 10 having an electrohydraulic actuator 11, by means of which the arc length can be set. The actuator 11 is connected to the output of an impedance regulator 12.

The phase current $i_1$ flowing through the electrode 1 and the phase voltage $u_{1M}$ between the associated secondary terminal of the furnace transformer 7 and the star point formed by the furnace vessel 5 with the material 6 to be melted are detected, respectively, via a current transformer 13 and a voltage transformer 14 and are converted, in a measurement device 15, into an actual impedance value $Z_1$ for the relevant furnace phase. This actual impedance value $Z_1$ is compared at an addition point 16 with a predetermined set impedance $Z_1^*$ for the relevant phase. The control error $\Delta Z_1$ obtained in this way is supplied as an input variable to the impedance regulator 12 which produces an actuating signal $S_1$, in order to adjust the height of the electrode 1, as a function of the control error $\Delta Z_1$.

The set impedance values $Z_1^*$, $Z_2^*$ and $Z_3^*$ are determined by means of an impedance optimizer 30 according to the invention. The impedance optimizer 30 calculates the set impedance values $Z_1^*$, $Z_2^*$ and $Z_3^*$ in such a manner that the power emission from the electrode 1, 2, 3 is a maximum. The temperature T of the three-phase arc furnace is monitored by means of a temperature measurement device 31. If the temperature T of the three-phase arc furnace exceeds a first critical temperature limit in the vicinity of an electrode 1, then the real power emitted from the electrode 1 is limited by the real-power emission from at least one of the other electrodes being raised, while the secondary voltage of the transformer 7 is not changed. The set impedance values $Z_1^*$, $Z_2^*$ and $Z_3^*$ are in this case calculated in such a manner that the total power emission is a maximum without the maximum permissible real-power emission from electrode 1 being exceeded. If the first critical temperature limit is exceeded in the vicinity of all the electrodes 1, 2 and 3, then the secondary voltage of the transformer 7 is reduced. The second voltage of the transformer 7 is also reduced if a second critical temperature limit is exceeded in the vicinity of an electrode 1.

The impedance optimizer 30 and the impedance regulator are advantageously implemented on a control and regulation device 32.

Figure 2:
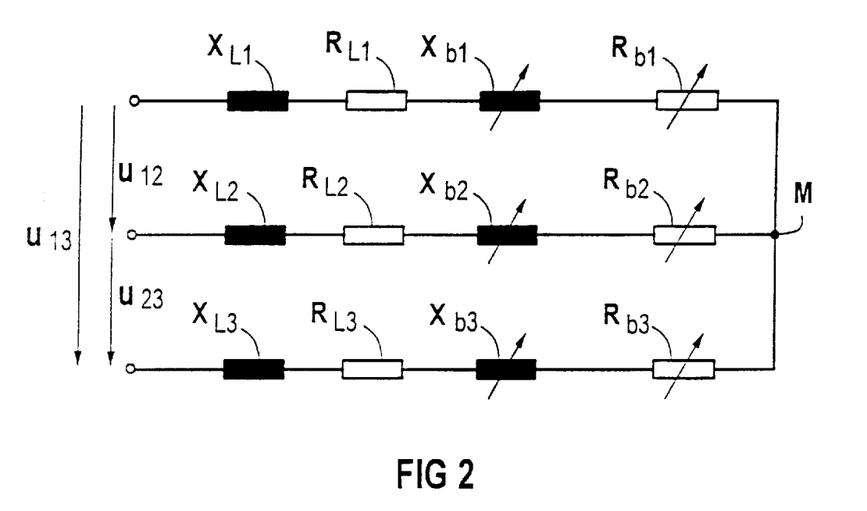
FIG. 2 shows a simplified electrical equivalent circuit of the three-phase arc furnace according to the present invention.

As the simplified electrical equivalent circuit of a three-phase arc furnace in FIG. 2 shows, the three-phase arc furnace represents a resistive-inductive load which is connected in star, is unbalanced, varies with time, and whose free star point M is formed by the material 6 to be melted. The electrical variables associated with the individual phases are provided with the indices k=1, 2, 3 corresponding to the associated electrodes in FIG. 1. The concatenated voltages between the furnace phases are denoted by $u_{12}$, $u_{23}$ and $u_{13}$, and the individual phase currents are denoted $i_1$, $i_2$ and $i_3$. The cable resistances $R_{L1}$, $R_{L2}$ and $R_{L3}$ and the cable reactances $X_{L1}$, $X_{L2}$ and $X_{L3}$ formed by the electrodes 1, 2 and 3 and their supply cables can be determined by measurement in a short-circuit test, that is to say by placing the electrodes 1, 2 and 3 against the scrap metal 6.

The electrical behavior of an arc 9 is described by a non-linear and discontinuous current/voltage characteristic whose profile is dependent on the distance between the electrode tip and the melt. In the illustrated equivalent circuit, each arc 9 is replaced respectively by an arc resistance $R_{b1}$, $R_{b2}$, $Rb_3$ and an arc reactance $X_{b1}$, $X_{b2}$, $X_{b3}$. The arc resistance and reactance of each individual arc 9 are dependent not only on the length of the associated arc 9, but also on the arc lengths of the respective other arcs. Thus, if, for example, the distance between the electrode 1 and the melt 6 is varied, then the arc resistances $R_{b2}$ and $R_{b3}$ and arc reactances $X_{b2}$ and $X_{b3}$ also vary as well as the arc resistance $R_{b1}$ and the arc reactance $X_{b1}$.

The real power which is consumed in the individual arcs can be calculated with the aid of the complex alternating-current calculation for the linearized equivalent circuit shown in FIG. 2. If the reactances $X_{Lk}$ and $X_{bk}$ in each phase are in this case combined to form an operating reactance $X_k$ and the resistances $R_{Lk}$ and $R_{bk}$ are combined, ignoring the cable loss resistances $R_{Lk}$, to form an operating resistance $R_k$ where k=1, 2, 3, then the real power levels $P_k$ in the individual arcs 9 are as follows:

$P_1 = P_1(U_0, R_1, R_2, R_3, X_1, X_2, X_3)$ $P_2 = P_2(U_0, R_1, R_2, R_3, X_1, X_2, X_3)$ $P_3 = P_3(U_0, R_1, R_2, R_3, X_1, X_2, X_3)$

In this case $U_0$ denotes the root-mean-square value of the concatenated voltage set via the furnace transformer 7 for the three-phase system, which is assumed to be balanced. The total real power consumed in the arc 9 is then given by $P = \Sigma P_k (U_0, R_1, R_2, R_3, X_1, X_2, X_3)$ where k=1, 2, 3.

As already mentioned, the resistances $R_k$ and reactances $X_k$ in each furnace phase vary with the arcs length, although the relationship between the resistances $R_k$ and the reactances $X_k$ is not linear. If this relationship is known, the number of unknown variables on which the total real power in the arcs depends is reduced to four. In order to maximize the total real powe P, these four variables can be regulated with the aid of the four available manipulated variables, namely the transformer voltage $U_0$ and the three manipulated variables $S_1$ $S_2$ and $S_3$ for adjusting the height of the individual electrodes 1, 2 and 3. In other words, if the non-linear relationships between the resistances $R_k$ and reactances $X_k$ can be described by a non-linear function $X_k = NN_k (R_1, R_2, R_3)$, an optimum resistance triplet $R_{1opt}$, $R_{2opt}$, $R_{3opt}$ occurs at the maximum of the total real power P, from which, in turn, the optimum set impedances $Z_1^*$, $Z_2^*$ and $Z_3^*$ for impedance regulation, and thus the height adjustment of the electrodes 1, 2, 3, can be calculated using the functions $NN_k$.

Figure 3:
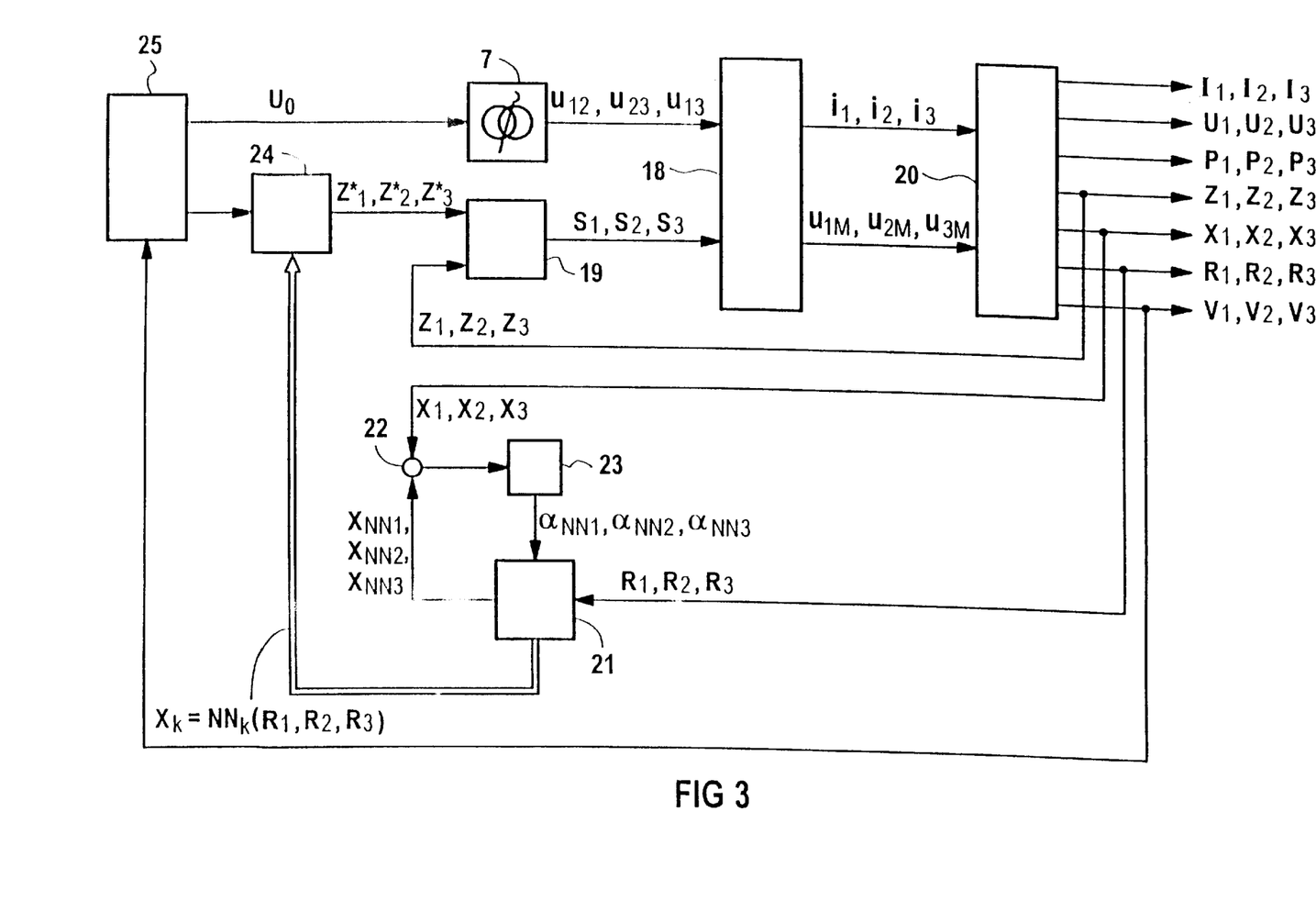
FIG. 3 shows a power regulation system according to the present invention.

FIG. 3 shows one example of the regulation for the melting process in the three-phase arc furnace, based on a block diagram. The arc furnace 18 is fed from the furnace transformer 7 with the concatenated voltages $u_{12}$, $u_{23}$ and $u_{13}$. The distances between the electrodes 1, 2 and 3 and the material 6 to be melted are set as a function of the control signals $S_1$, $S_2$, $S_3$ which are provided by impedance regulators 12 which are assigned individually to the electrodes 1, 2 and 3 and are in this case combined in an impedance regulation arrangement 19. The impedance regulation arrangement 19 in this case produces the control signals $S_1$, $S_2$, $S_3$ as a function of the control errors between predetermined set impedance values $Z_1^*$, $Z_2^*$, $Z_3^*$ and measured actual impedance values $Z_1$, $Z_2$, $Z_3$ for the arc furnace 18. The phase voltages $u_{1M}$, $u_{2M}$, $u_{3M}$ and phase currents $i_1$, $i_2$, $i_3$ are sampled continuously with a high sampling rate in a measurement device 20, and are pre-processed in time with the basic oscillation period. In this case, the measured variables $u_{kM}$ and $i_{kM}$, where k=1, 2, 3, are used to calculate the root-mean-square values of the phase voltages $U_1$, $U_2$, $U_3$, the root-mean-square values of the phase currents $I_1$, $I_2$, $I_3$, the phase real-power levels $P_1$, $P_2$, $P_3$ and the furnace impedances, that is to say the actual impedance values $Z_1$, $Z_2$, $Z_3$ where $Z_k = U_k/I_k$. The associated actual resistance values $R_1$, $R_2$, $R_3$ where $R_k = P_k/I_k^2$ and the actual reactance values $X_1$, $X_2$, $X_3$ where $X_k = (Z_k^2 - R_k^2)^{1/2}$ are also calculated together with the actual impedance values. Finally, the thermal wall loads $V_1$, $V_2$, $V_3$, caused by the arcs 9, in the arc furnace 18 are also determined using, for example, $$V_k = P_k^2/I_k^2$$

The continuously predetermined actual resistance values $R_1$, $R_2$, $R_3$ are supplied to a neural network 21 which is used to determine, by the use of a learning process, the relationships between the measured actual resistance values $R_1$, $R_2$, $R_3$ and the actual reactance values $X_1$, $X_2$, $X_3$. To do this, the neural network 21 produces three network responses $X_{NN1}$, $X_{NN2}$, $X_{NN3}$ on the output side, which are compared in a comparison device 22 with the associated actual reactance values $X_1$, $X_2$, $X_3$. Depending on the comparison results, the network parameters $\alpha_{NN1}$, $\alpha_{NN2}$, $\alpha_{NN3}$ of the neural network 21 are varied in a learning algorithm 23, in the sense of reducing the errors between the network responses $X_{NNk}$ and the actual reactance values $X_k$. The relationships between the resistances $R_k$ and reactances $X_k$ are learnt in this way, and the knowledge thus obtained is updated continuously, as a function of the ongoing process activity. Instead of a single neural network, three different neural networks may also be provided, to the input sides of each of which all the actual resistance values $R_1$, $R_2$, $R_3$ are supplied, and from which each neural network supplies in each case one network response $X_{NNk}$.

The learnt relationship $X_k = NN_k (R_1, R_2, R_3)$ is transmitted to a computation device 24 in which the total real power P of the arcs 9 is represented, on the basis of the equivalent circuit shown in FIG. 2, as a function of the root-mean-square value of the concatenated voltage $U_0$, of the resistances $R_1$, $R_2$, $R_3$ and of the reactances $X_1$, $X_2$, $X_3$. For a predetermined voltage level $U_0$, the maximum real power $P_{max}$ is obtained on the basis of the condition $\partial P/\partial R_1 = 0$, $\partial P/\partial R_2 = 0$ and $\partial P/\partial R_3 = 0$. The solution to these equations gives the resistance values $R_{1opt}$, $R_{2opt}$, $R_{3opt}$ where $R_{kopt} = R_{kopt}(X_1, X_2, X_3)$ at the maximum real power $P_{max}$. In a next step, the relationship $X_k = NN_k (R_1, R_2, R_3)$ is used as the basis for obtaining the reactances $X_{1opt}$, $X_{2opt}$, $X_{3opt}$ associated with the resistances R1opt, R2opt, R3opt and thus, finally, the set impedance values $Z_1^*$, $Z_2^*$, $Z_3^*$ where $Z_k^* = (R_{kopt}^2 + X_{kopt}^2)^{1/2}$.

The condition stated above, that the derivative of the total real power P tends to zero at the optimum on the basis of the resistances $R_k$, is permissible only if there are no boundary conditions and the global optimum has been reached. However, since, as a rule, the phase currents $i_k$, the thermal wall load $V_k$ and the resistances $R_k$ are subject to boundary conditions, the optimization task consists of maximizing the total real power P while complying with the boundary conditions. The boundary conditions may be any non-linear functions of the variables $U_0$, $R_1$, $R_2$, $R_3$, $X_1$, $X_2$, $X_3$, although the relationships between the variables $R_k$ and $X_k$ are known from the knowledge contained in the neural network 21. In the block diagram shown in FIG. 3, the determined thermal wall loads $V_1$, $V_2$, $V_3$ are used in computation unit 25 to determine the secondary conditions for maximizing the total real power P, and these secondary conditions are transmitted to the computation device 24.

Figure 4:
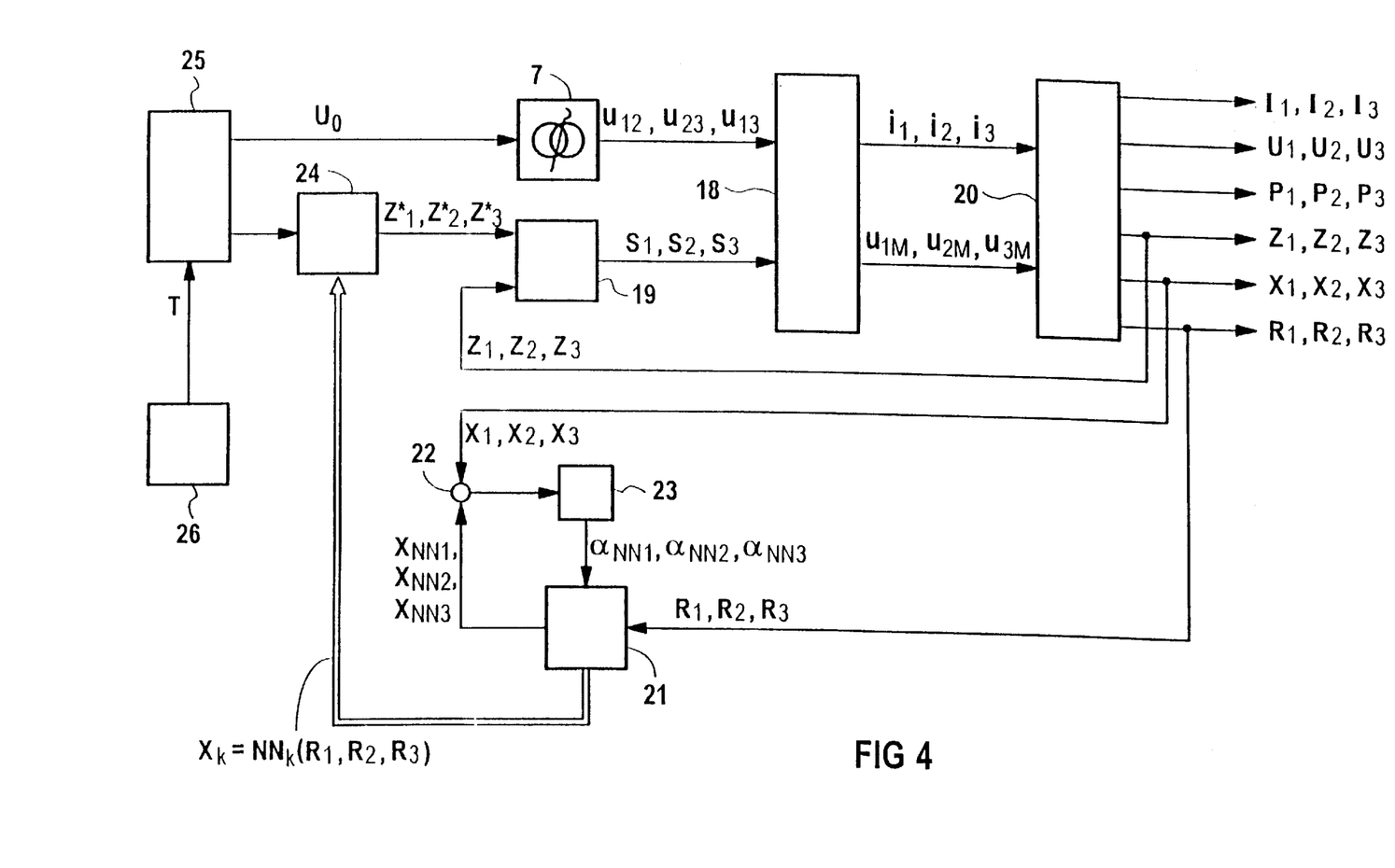
FIG. 4 shows an alternative embodiment of a power regulation system.

FIG. 4 shows an alternative embodiment. In this case, temperature measured values T, which are determined using a measurement device 26, are used instead of the thermal wall loads. If the temperature measured values or the determined wall loads exceed specific critical values, then, in a particularly advantageous refinement, the voltage step $U_0$ to which the fernace transformer 7 is set is not reduced. The voltage step $U_0$ is not reduced until a second critical temperature limit has been exceeded, which is above the first critical temperature limit.

In another alternative embodiment, not only are the thermal wall loads $V_1$, $V_2$, $V_3$ determined, but the temperature measured values T are determined, using a measurement device 26.

FIG. 5 shows an impedance regulation system according to the present invention. As a rule, three-phase arc furnaces have cooling boxes on the upper part of the wall, whose task is to dissipate that portion of the radiation energy which is radiated to the wall rather than into the steel bath. These cooling boxes typically operate with evaporation cooling or with water cooling. If the radiation energy which is radiated directly to the cooling boxes becomes excessive or is too great over a certain time period, then the cooling boxes can no longer completely dissipate the energy. In the case of evaporation cooling, this is indicated by a reduction in the flow rate and, in the case of water cooling, by a rise in the water return temperature.

Overloading of the cooling boxes shall be avoided since, on the one hand, the cooling boxes are damaged and, on the other hand, overloading may also be regarded as a measure of wear of the refractory material on the lower part of the wall of the arc furnace. For this reason, any regulation system must react to heat acting on the cooling boxes. Until now, it has generally been done by reducing the secondary voltage, and thus also by noticeably reducing the total real power.

It has been found that, normally, heat does not act simultaneously on all the cooling boxes, but generally only on one cooling box or on cooling boxes which are positioned in the area of one of the three electrodes. (Each cooling box is associated with that electrode which it is closest to). The regulation system according to the present invention reacts to heat acting only in the area of an electrode by reducing the radiation power of the relevant electrode while keeping the secondary voltage constant, and by emitting at least a portion of this power to the two other electrodes. This is achieved by a deliberate change to the three phase impedances, that is to say the impedances in the current paths to the electrodes. The three phase impedances are in this case set using an optimization method. In this case, the total real power is maximized using the boundary or secondary condition that the power of the relevant electrode is reduced by a specific reduction factor F with respect to the power and time at which the heat action took place.

As is shown in FIG. 5, the regulation system in this case distinguishes between four different cases:

1. If the heat action is less than a constant DQ_K1 which corresponds to a first critical temperature limit, then no action is taken and the regulation system sets the phase impedances such that the total real power of all three electrodes is maximized.

2. If the heat action is between the constants DQ_K1 and DQ_K2, which corresponds to a second critical temperature limit, then the power is redistributed from the relevant electrode to the two other electrodes, without the secondary voltage being reduced. The power to the relevant electrode is reduced by a reduction factor which is dependent on the intensity of the heat action. The reduction factor F is advantageously calculated using, for example, $$F = \frac{W - DQ\_K1}{DQ\_K2 - DQ\_K1} \times 0.9$$

where W denotes the action of the heat.

3. If the heat action is between DQ_K2 and DQ_K3, which corresponds o a third critical temperature limit, then, owing to the very severe action of the heat, not only is the secondary voltage reduced, but the power to the relevant electrode is also redistributed to the other electrodes. For example, the reduction factor could be F=0.9.

4. If the heat action is greater than DQ_K3, then the secondary voltage is reduced, as a type of emergency shutdown, to a very low transformer step.

The value of the reduction factor F and the constants DQ_K1, DQ_K2 and DQ_K3 are matched to the nature of the cooling boxes and to the conditions in the arc furnace. Thus, for example, for evaporation cooling, the constants may be chosen such that they occur at a flow rate reduction of 10, 20 and 50%, as is shown in FIG. 1. For water cooling they could, for example, advantageously be chosen to occur at return temperatures of 80, 90 and 105° C.

The reduction in the power to the relevant electrode by the factor F is continued until the action of the heat has been reduced.

The critical temperature limits may therefore be temperatures in the actual sense, such as coolant temperatures or equivalent variables, such as the reduction in the flow rate in the case of evaporation cooling.

The advantages of the present invention are, on the one hand, the increase in the production rate and the reduction in the switching steps on the supply transformer. In addition to the considerable cost reduction from an increase in the production rate, the reduction in the switching processes in the supply transformer also has a major economic advantage. The switching processes in the supply transformer are the major influencing variables that reduce the life of the transformer and increase the maintenance frequency. The present invention thus reduces the frequency of maintenance work on the supply transformer. This in turn leads to considerable cost savings, and improves the availability of the three-phase arc furnace.

LIST OF REFERENCE SYMBOLS

1,2,3 Electrodes
4 Furnace cover
5 Furnace vessel
6 Scrap metal
7 Furnace transformer
8 Three-phase power supply
9 Arc
10 Positioning apparatus
11 Electrohydraulic actuator
12 Impedance regulator
13 Current transformer
14 Voltage transformer
15 Measurement device
16 Addition point
17 Supporting arm
18 Arc furnace
20 Measurement device
21 Neural network
22 Comparison device
23 Learning algorithm
24 Computation device
25 Computation unit
26 Measurement device
30 Impedance optimizer
32 Control and regulation device

What is claimed is:

1. A method for regulation or control of a melting process in a three-phase arc furnace having at least three electrodes, each of the electrodes having a height which is adjustable individually and independently of one another, comprising the steps of:

assigning phases of a three-phase current which feeds the three-phase arc furnace to at least one of the electrodes;

monitoring a temperature of the three-phase arc furnace; and when the three-phase arc furnace reaches a critical temperature in the vicinity of one of the electrodes, i) reducing power emission from the one of the electrodes to prevent overheating of the three-phase arc furnace, and ii) increasing power emission from at least another of the electrodes so that total power emission from the electrodes is a maximum at a predetermined voltage.

2. The method according to claim 1, wherein the monitoring step includes the step of monitoring walls of the three-phase electrodes in the vicinity of the electrodes.

3. The method according to claim 1, further comprising the steps of:

when the three-phase furnace reaches the critical temperature in the vicinity of the one of the electrodes, i) increasing an impedance in a current path of the one of the electrodes, and ii) decreasing an impedance in a current path of the at least another of the electrodes.

4. The method according to claim 3, wherein the increasing the impedance step includes the step of adjusting the height of the one of the electrodes to increase the current path to the at least one of the electrodes, and wherein the decreasing the impedance step includes the step of adjusting the height of the at least another of the electrodes to decrease the current path to the at least another of the electrodes.

5. The method according to claim 1, further comprising the steps of:

optimizing impedance of current paths of the electrodes to maximize total power emission from the electrodes; and when the three-phase arc furnace reaches the critical temperature in the vicinity of the one of the electrodes, limiting power emission from the one of the electrodes to a first maximum value, the first maximum value being taken into account as a first secondary consideration in the optimizing step.

6. The method according to claim 5, further comprising the step of:

limiting currents through the electrodes to second maximum values, the second maximum values being taken into account as a second secondary consideration in the optimizing step.

7. The method according to claim 5, wherein the optimizing step includes the step of optimizing the impedance of the current paths of the electrodes online.

8. The method according to claim 3, further comprising the step of:

if the temperature of the three-phase arc furnace in the vicinity of the one of the electrodes is above a first critical temperature limit and below a second critical temperature limit, redistributing power emission of the electrodes, a supply voltage to the electrodes being kept constant.

9. The method according to claim 8, further comprising the step of:

if the temperature of the three-phase arc furnace in the vicinity of the one of the electrodes is above the second critical temperature limit, i) redistributing power emission from the electrodes, and ii) reducing the supply voltage.

10. The method according to claim 9, further comprising the step of:

if the temperature of the three-phase arc furnace in the vicinity of the one of the electrodes is above a third critical temperature limit, the third critical temperature limit being above the second critical temperature limit, reducing the supply voltage.

11. The method according to claim 1, further comprising the step of:

estimating the temperature of the three-phase arc furnace before the monitoring step using one of a gradient method and a temperature model.

12. The method according to claim 1, further comprising the steps of:

after the reducing the power emission step, i) when the temperature of the three-phase arc furnace decreases, increasing the power emission from the one of the electrodes, and ii) when the temperature of the three-phase arc furnace increases, decreasing the power emission from the one of the electrodes, a critical furnace temperature being predetermined at a set temperature for temperature regulation.

13. A three-phase arc furnace, comprising:

at least three electrodes, each of the electrodes having a height which is adjustable individually and independently of one another, each phase of a three-phase current being assigned to at least one of the electrodes; and a control device monitoring a temperature of the three-phase arc furnace and when the three-phase arc furnace reaches a critical temperature in the vicinity of one of the electrodes, the control device i) reduces power emission from the one of the electrodes to prevent the three-phase arc furnace from overheating, the control device, and ii) increases power emission from at least another of the electrodes so that total power emission from the electrodes remain constant.

* * * * *